United States Patent [19]

Davis et al.

[11] Patent Number: 5,039,772

[45] Date of Patent: Aug. 13, 1991

[54] FLAME RETARDANT ORGANOPOLYSILOXANE-POLYCARBONATE GRAFT COPOLYMERS

[75] Inventors: Gary C. Davis; Barbara E. McGrath, both of Albany; Kevin M. Snow, Clifton Park, all of N.Y.

[73] Assignee: General Electric Company, Schenectady, N.Y.

[21] Appl. No.: 572,298

[22] Filed: Aug. 27, 1990

[51] Int. Cl.$^5$ .............................................. C08G 77/06
[52] U.S. Cl. ........................................ 528/15; 528/26; 528/31; 528/25; 528/29
[58] Field of Search ................. 528/26, 31, 25, 29, 528/15

[56] References Cited

U.S. PATENT DOCUMENTS 3,450,736  6/1969  DeMonterey ........................ 528/26
3,781,378 12/1973  Kantor ................................ 528/29
4,613,641  9/1986  Haubennestel et al. ............. 528/26
4,748,225  5/1988  Yoshioka et al. ................... 528/26
4,839,443  6/1989  Akutsu et al. ...................... 528/26
4,945,148  7/1990  Rich et al. ......................... 528/25

Primary Examiner—Melvyn I. Marquis
Assistant Examiner—Margaret Glass
Attorney, Agent, or Firm—William A. Teoli; James C. Davis, Jr.; William H. Pittman

[57] ABSTRACT

Flame retardant graft organopolysiloxane-polycarbonate copolymers are provided which can be made by effecting addition between a silicon-hydride siloxane and an aliphatically unsaturated substituted bisphenol followed by phosgenation of the resulting adduct. Alternatively, direct addition of the silicon-hydride siloxane onto an aliphatically unsaturated substituted polycarbonate backbone also can be effected.

10 Claims, No Drawings

FLAME RETARDANT ORGANOPOLYSILOXANE-POLYCARBONATE GRAFT COPOLYMERS

CROSS REFERENCE TO RELATED APPLICATION

Reference is made to copending application RD-20,484, filed concurrently herewith.

BACKGROUND OF THE INVENTION

The present invention relates to flame retardant organopolysiloxane-polycarbonate graft copolymers which can be made by effecting a platinum catalyzed addition between a silicon hydride organosiloxane and a bisphenol having at least one aliphatically unsaturated organic radical attached to the aromatic ring by a carbon-carbon bond. The aforementioned bisphenol organic-siloxane adduct can be phosgenated in combination with additional bisphenol to produce an organopolysiloxane-polycarbonate graft copolymer. An alternative procedure for making the flame retardant organopolysiloxane-polycarbonate graft copolymers is to effect the platinum catalyzed addition between a silicon hydride organosiloxane and an aromatic polycarbonate having a significant degree of aromatic ring substitution with C-C bound aliphatically unsaturated organic radicals.

In copending application Ser. No. 07/455,122, filed Dec. 12, 1989, flame retardant thermoplastic silicone polyphenylene ether graft copolymers are shown. A phenol-siloxane macromer is oxidatively coupled with monohydric phenol to produce a thermoplastic flame retardant silicone-polyphenylene ether graft copolymer. The phenolsiloxane macromer can be made by effecting a hydrosilylation addition reaction between an aliphatically unsaturated phenol and a hydride terminated polydiorganosiloxane.

Additional flame retardant aromatic thermoplastic organic polymers and methods for making are constantly being sought by the thermoplastics industry.

As used hereinafter, the term "flame retardance" or "nonflammable" with respect to the flame retardant polycarbonate compositions of the present invention means that the flame retardant polycarbonates have satisfied UL94 V-0 requirements for flammability, as shown by the "Flammability of Plastic Materials Bulletin" of Jan. 24, 1980. More particularly, a 5"×$\frac{1}{2}$"×$\frac{1}{8}$" polycarbonate test bar is suspended vertically over a $\frac{3}{4}$" Bunsen Burner flame as provided in the aforementioned UL94 test. The test sample preferably exhibits a UL94 V-0 rating which includes the following criteria:

A. not have any specimens which burn with flaming combustion for more than 10 seconds after application of the test flame.
B. not have a total flaming combustion time exceeding 50 seconds for 10 flame applications for each set of five specimens.
C. not have any specimens which burn with flaming or glowing combustion up to the holding clamp.
D. not have any specimens which drip flaming particles that ignite dry absorbent surgical cotton located 12 inches (305 mm) below the test specimen.
E. not have any specimens with glowing combustion which persists for more than 30 seconds after the second removal of the test flame.

SUMMARY OF THE INVENTION

The present invention is based on the discovery that flame retardant graft organopolysiloxane-polycarbonate copolymers can be made by effecting a platinum catalyzed addition reaction between a silicon hydride polydiorganosiloxane of the formula,

and a bisphenol having at least 1 nuclear bound aliphatically unsaturated organic radical of the formula,

to produce a bisphenol polydiorganosiloxane adduct of the formula,

which can be directly phosgenated, or can be mixed prior to phosgenation with additional bisphenol of the formula,

to produce a flame retardant graft organopolysiloxane-polycarbonate copolymer, where R is a C(1–13) monovalent hydrocarbon radical, or a C(1–13) monovalent hydrocarbon radical substituted with radicals inert during equilibration or condensation, $R^1$ is a $C_{(1-13)}$ monovalent hydrocarbon radical or a $C_{(1-13)}$ monovalent hydrocarbon radical substituted with radicals inert during equilibration and condensation, $R^2$ is a $C_{(6-30)}$ polyvalent aromatic organic radical, $R^3$ is a $C_{(2-10)}$ aliphatically unsaturated organic radical, Q is a monovalent radical having the formula,

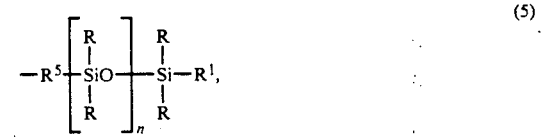

$R^4$ is a $C_{(6-30)}$ divalent aromatic organic radical, $R^5$ is a $C_{(2-10)}$ aliphatic organic radical, n is a whole number having a value of from 0 to 100 inclusive and a is an integer having a value of 1 to 4 inclusive.

Radicals included within R of formulas 1 and 5 are, for example $C_{(1-8)}$ alkyl radicals, such as methyl, ethyl, propyl, butyl, pentyl and $C_{(6-13)}$ aryl radcials such as phenyl, tolyl, xylyl, naphthyl and halogenated derivatives thereof such as trifluoropropyl, and chlorophenyl. Radicals included within $R^1$ are, for example, methyl, sec-butyl and phenyl. Radicals included within $R^3$ are, for example, vinyl and allyl. Radicals included within $R^2$ are preferably

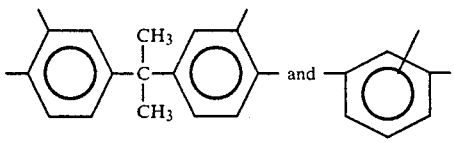

Radicals included within $R^4$ are preferably

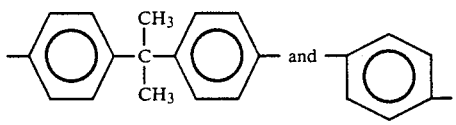

The flame retardant graft organopolysiloxane-polycarbonate copolymers can be made by phosgenating the bisphenol organopolysiloxane adduct of formula (3), or a mixture thereof with from 0.1 to 99.99 moles of a bisphenol of formula (4), per mole of the bisphenol organosiloxane adduct of formula (3), and preferably 80 to 99.99 moles.

An alternative procedure for making the flame retardant graft organopolysiloxane-polycarbonate copolymers, is by effecting a platinum catalyzed addition reaction between a silicon hydride polydiorganosiloxane of formula (1), and an aromatic polycarbonate comprising condensed aliphatically unsaturated carbonate units of the formula,

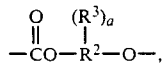  (6)

where $R^2$, $R^3$ and a are as previously defined.

STATEMENT OF THE INVENTION

There is provided by the present invention, flame retardant organopolysiloxane-polycarbonate graft copolymers comprising condensed units of the formula,

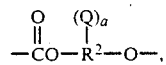  (7)

where Q, $R^2$ and a are as previously defined.

Some of the dihydric phenols which are included within formula (4) and useful for making the flame retardant organopolysiloxane-polycarbonate graft copolymers are for example,
resorcinol;
4-bromoresorcinol;
hydroquinone;
4,4'-dihydroxybiphenyl;
bis(4-hydroxy-3,5-dimethyl)biphenyl;
1,6-dihydroxynaphthalene;
2,6-dihydroxynaphthalene;
bis(4-hydroxyphenyl)methane;
bis(4-hydroxyphenyl)diphenylmethane;
bis(4-hydroxyphenyl)-1-naphthylmethane;
1,1-bis(4-hydroxyphenyl)ethane;
1,2-bis(4-hydroxyphenyl)ethane;
1,1-bis(4-hydroxyphenyl)-1-phenylethane;
2,2-bis(4-hydroxyphenyl)propane ("bisphenol A");
2-(4-hydroxyphenyl)-2-)3-hydroxyphenyl)propane;
2,2-bis(hydroxyphenyl)butane;
1,2-bis(4-hydroxyphenyl)isobutane;
1,1-bis(4-hydroxyphenyl)cyclohexane;
1,1-bis(4-hydroxyphenyl)cyclododecane;
trans-2,3-bis(4-hydroxyphenyl)-2-butene;
2,2-bis(4-hydroxyphenyl)adamantane;
α,α'-bis(4-hydroxyphenyl)toluene;
bis(4-hydroxyphenyl)acetonitrile;
2,2-bis(3-methyl-4-hydroxyphenyl)propane;
2,2-bis(3-ethyl-4-hydroxyphenyl)propane;
2,2-bis(3-n-propyl-4-hydroxyphenyl)propane;
2,2-bis(isopropyl-4-hydroxyphenyl)propane;
2,2-bis(3-sec-butyl-4-hydroxyphenyl)propane;
2,2-bis(3-t-butyl-4-hydroxyphenyl)propane;
2,2-bis(cyclohexyl-4-hydroxyphenyl)propane;
2,2-bis(3-allyl-4-hydroxyphenyl)propane;
2,2-bis(3-methoxy-4-hydroxyphenyl)propane;
2,2-bis(3,5-dimethyl-4-hydroxyphenyl)propane
2,2-bis(2,3,5,6-tetramethyl-4-hydroxyphenyl)propane;
2,2-bis(3,5-dichloro-4-hydroxyphenyl)propane;
2,2-bis(3,5-dibromo-4-hydroxyphenyl)propane;
2,2-bis(2,6-dibromo-3,5-dimethyl-4-hydroxyphenyl)-
  propane;
α,α-bis(4-hydroxyphenyl)toluene;
α,α,α',α'-tetramethyl-α,α'-bis(4-hydroxyphenyl)-p-
  xylene
2,2-bis(4-hydroxyphenyl)hexafluoropropane;
1,1-dichloro-2,2-bis(4-hydroxyphenyl)ethylene;
1,1-dibromo-2,2-bis(4-hydroxyphenyl)ethylene;
1,1-dichloro-2,2-bis(5-phenoxy-4-hydroxyphenyl)ethy-
  lene
4,4'-dihydroxybenzophenone;
3,3-bis(4-hydroxyphenyl)-2-butanone;
1,6-bis(4-hydroxyphenyl)-1,6-hexanedione;
bis(4-hydroxyphenyl)ether;
bis(4-hydroxyphenyl)sulfide;
bis(4-hydroxyphenyl)sulfone;
bis(4-hydroxyphenyl)sulfoxide;
bis(4-hydroxyphenyl)sulfone;
bis(3,5-dimethyl-4-hydroxyphenyl)sulfone;
9,9-bis(4-hydroxyphenyl)fluorene
2,7-dihydroxypyrene;
6,6'-dihydroxy-3,3,3',3'-tetramethylspiro(bis)indane
  ("spirobiindane bisphenol")
3,3-bis(4-hydroxyphenyl)phthalide;
2,6-dihydroxydibenzo-p-dioxin;
2,6-dihydroxythianthrene;
2,7-dihydroxyphenoxanthin;
2,7-dihydroxy-3,10-dimethylphenazine;
3,6-dihydroxydibenzofuran;
3,6-dihydroxydibenzothiophene;
2,7-dihydroxycarbazole;
4,4'-dihydroxy-diphenyl-1,1-butane;
4,4'-dihydroxy-diphenyl-1,1-isobutane;
4,4'-dihydroxy-diphenyl-1,1-cyclopentane;
4,4'-dihydroxy-diphenyl-1,1-cyclohexane;
4,4'-dihydroxy-diphenyl-phenyl methane;
4,4'-dihydroxy-diphenyl-2-chlorophenyl methane;
4,4'-dihydroxy-diphenyl-2,4-dichlorophenyl methane;
4,4'-dihydroxy-diphenyl-p-isopropylphenyl methane;
4,4'-dihydroxy-diphenylnaphthyl methane;
4,4'-dihydroxy-diphenyl-2,2-propane;
4,4'-dihydroxy-3,3-methyl-diphenyl-2,2-propane;
4,4'-dihydroxy-3-cyclohexyl-diphenyl-2,2-propane;
4,4'-dihydroxy-3-methoxy-diphenyl-2,2-propane;
4,4'-dihydroxy-3-isopropyl-diphenyl-2,2-propane;
4,4'-dihydroxy-3,3'-dimethyl-diphenyl-2,2-propane;
4,4'-dihydroxy-3,3'-dichloro-diphenyl-2,2-propane;
4,4'-dihydroxy-diphenyl ether.

The hydride polydiorganosiloxane of formula (1) can be made in accordance with the method shown by C. L. Frye et al., Reactions of Organo Lithium Reagents with Siloxane Substrates, JOC, 35, 1308–1314 (1970) which is incorporated herein by reference. A typical procedure involves the reaction of 3 equivalents of butyllithium with hexamethylcyclotrisiloxane followed by the reaction of the resulting polydimethylsiloxane end stopped at one end with a dimethylbutylsiloxy unit and at the other end with a dimethyllithiumsiloxy unit. The resulting lithiated intermediate can thereafter be reacted under appropriate conditions with a silicon hydride, such as dimethylchlorosilane, to effect the addition of the silicon hydride functional unit. Although the employment of hexamethylcyclotrisiloxane is the preferred reactant, other cyclic diorganosiloxanes can be used, such as trimethyltriethylcyclotrisiloxane;
trimethyltriphenylcyclotrisiloxane
hexaphenylcyclotrisiloxane;
trimethylcyclotrisiloxane;
1,3,5-tris[(cyanoethyl)methyl]cyclotrisiloxane;
1,3,5-tris[(3,3,3-trifluoropropyl)methyl]cyclotrisiloxane;
1,3,5-tris[(2-(2,3-cyclohexaneoxide))methyl]cyclotrisiloxane Aliphatically unsaturated phenols which are included within formula (2) are, for example, 2,2'-bisallyl bisphenol A
2-allyl hydroquinone
3,3'-bisallyl-4,4'-dihydroxybiphenyl Platinum catalysts which can be used in the practice of the present invention to effect the condensation between the hydride polydiorganosiloxane of formula (4) and the aliphatically unsaturated phenol of formula (3) are, for example, the reaction products of an olefin and chloroplatinic acid as described in Ashby, U.S. Pat. No. 3,159,601, or the reaction product of a platinic chloride and cyclopropane as described in Ashby, U.S. Pat. No. 3,159,662. Further platinum complexes which can be used as the platinum catalyst are reaction products of chloroplatinic acid with up to 2 moles, per gram of platinum of a member selected from the class consisting of alcohols, ethers, aldehydes and mixtures thereof, as shown in Lamoreaux, U.S. Pat. No. 3,220,972. In addition, platinum dispersed on carbon can be used. The preferred platinum catalyst is shown by Karstedt, U.S. Pat. No. 3,775,452, which is formed by reacting chloroplatinic acid with tetramethyldivinyldisiloxane in the presence of sodium bicarbonate in an ethanol solution. It has been found that effective results can be achieved if sufficient platinum catalyst is employed to provide from 1 to 250 parts per million of platinum, preferably from 1 to 200 parts of platinum per million parts of mixture.

In order that those skilled in the art will be better able to practice the present invention, the following example is given by way of illustration and not by way of limitation. All parts are by weight.

EXAMPLE 1

There was added 30 μl (120 ppm Pt) of a platinum catalyst shown in U.S. Pat. No. 3,715,334 to a stirred solution of 3.45 grams of bis-allyl bisphenol A and 20.0 grams of polydimethylsiloxane having 12 dimethylsiloxy units and terminated at one end with an isobutyl radical and the other end with a hydrogen atom attached to silicon and 26 ml of toluene. The solution was warmed to 45° C. and after 10 minutes the solution turned yellow. VPC analysis after 20 minutes indicated the hydrosilylation was complete. The volatile components were removed at 2 torr by roto-evaporation to give 23 grams of a polydimethylsiloxane bis-allyl bisphenol A adduct. A vigorously stirred mixture of 5 grams of the polydimethylsiloxane bis-allyl bisphenol A adduct, 21.7 grams of bisphenol A, 150 ml of methylene chloride, 100 ml of water, 0.45 gram of p-cumylphenol chainstopper, and 1 gram of triethylamine was phosgenated with 11.9 grams of phosgene. The pH of the mixture was maintained between 9 and 11 with aqueous sodium hydroxide. The methylene chloride layer was washed with dilute HCl followed by water, precipitated into methanol and dried. Based on method of preparation there was obtained an organopolysiloxane-polycarbonate graft copolymer having an $\overline{M}_n$ of 18,000 and 2.0 mole percent of condensed bis-allyl bisphenol A units grafted with polydimethylsiloxane.

Additional copolymers were made following the same procedure to provide additional organopolysiloxane-polycarbonate copolymer having condensed polydimethylsiloxane bis-allyl bisphenol units over a mole percent range of from 0.8 to 5 and polydimethylsiloxane blocks in the scope of formula (5) where n was 0 to 25. Compression molded 1/16" samples were evaluated, including a sample (control) having 5 mole percent of condensed bis-allyl bisphenol A units free of grafted polydimethylsiloxane, for a V-0 UL94 rating. The following results were obtained, where "FOT" is flame out time, "FD" is flaming drip and "s" is seconds:

TABLE I

| Bis-allyl-siloxane units (mole %) | n | $M_n$ | FOT(1) | FOT(2) | Rating |
|---|---|---|---|---|---|
| Control | — | 23K | FD | — | — |
| 3.5 | 0 | 20.4K | 2.1 s | 4.6 s | V-0 |
| 2.0 | 11 | 18K | 5.1 s | 12.2 s | V-1 |
| 0.5 | 11 | 33K | 3.1 s | 3.9 s | V-0 |
| 0.6 | 25 | 29K | 3.1 s | 6.3 s | V-0 |
| 0.6 | 5.5 | 29K | 2.2 s | 4.5 s | V-0 |
| 0.8 | 5.5 | 20K | 8.4 s | 7.8 s | V-1 |

EXAMPLE 2

A mixture of 53.9 grams of bis-allyl bisphenol A and 1596 grams of bisphenol A suspended in 15L of methylene chloride and 12L of water along with 7.26 grams of triethylamine and 48.74 grams of p-cumylphenol chainstopper was rapidly stirred, while 900 grams of phosgene was added. The pH of the reaction mixture was maintained between 9 and 11 with aqueous sodium hydroxide. The methylene chloride layer was washed with dilute HCl followed by water, precipitated into isopropanol and dried. Based on method of preparation there was obtained a polycarbonate having an $\overline{M}_n$ of 16,000 and 1.9% of condensed bis-allyl bisphenol A units.

There was added 1 gram of 5% platinum on carbon to 60 grams of the above bis-allyl containing bisphenol A polycarbonate dissolved in 1.5L of 1,2-dichloroethane. There was added to the stirring mixture at a temperature of 50° C., 50 grams of polydimethylsiloxane having 6 condensed dimethylsiloxy units, a terminal trimethylsiloxy unit and a terminal dimethylhydrogensiloxy unit. After 16 hours at a temperature of 80° C. the stirring mixture was allowed to cool and diluted with 2L of methylene chloride. The solution was filtered through a 1 inch pad of celite, and the product was precipitated into methanol and dried. Based on method of preparation, the product was a graft organopolysiloxane-polycarbonate copolymer having 1.8 mole percent of dimethylsiloxane substituted bis-allyl bisphenol A units. The $\overline{M}_n$ of the copolymer was 20,000. Additional grafted organopolysiloxane-polycarbonate copolymers were prepared following the same procedure utilizing polycarbonate having from 0.8 to 5 mole percent of condensed bis-allyl units and dimethylhydrogensiloxy units within the scope of formula (1), where n is 0 to 5.5. Injection molded 1/16" flame bars and compression molded ⅛" flame bars were evaluated for flame retardance using the UL-94 test, the following results were obtained, where under FOT, the values shown represent the number of flaming drips per bars ignited:

TABLE I

| Bis-allyl-siloxane units (mole %) | Thickness | n | $\overline{M}_n$ | FOT(1) | FOT(2) | Rating |
|---|---|---|---|---|---|---|
| Control | 1/16" | none | 16K | 5/5 FD | — | — |
| 1.8 | 1/16" | 6 | 20K | 1/5 FD | 0/4 FD | — |
| Control | ⅛" | none | 16K | 4.6 s | 4/5 FD | — |
| 1.8 | ⅛" | 6 | 20K | 2.3 s | 5.4 s | V-0 |

The above results show that the flame retardant graft organopolysiloxane-polycarbonate copolymers flame drip significantly less and possess superior flame retardance as compared to the allyl-substituted polycarbonates (Controls) free of organopolysiloxane grafts.

Although the above examples are directed to only a few of the very many variables which can be used to make the flame retardant graft organopolysiloxane-polycarbonate copolymers of the present invention, it should be understood that the present invention is directed to a much broader variety of flame retardant graft organopolysiloxane-polycarbonate copolymers as shown in the description preceding these examples.

What is claimed is:

1. Flame retardant organopolysiloxane-polycarbonate graft copolymers comprising chemically combined units of the formula,

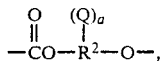

where Q is a monovalent radical having the formula,

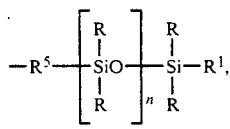

where R is a C(1–13) monovalent hydrocarbon radical, or a C(1–13) monovalent hydrocarbon radical substituted with radicals inert during equilibration or condensation, $R^1$ is a $C_{(1-13)}$ monovalent hydrocarbon radical or a $C_{(1-13)}$ monovalent hydrocarbon radical substituted with radicals inert during equilibration and condensation, $R^2$ is a $C_{(6-30)}$ polyvalent aromatic organic radical, $R^5$ is a $C_{(2-10)}$ aliphatic organic radical, n is a whole number having a value of from 0 to 100 inclusive and a is an integer having a value of 1 to 4 inclusive.

2. A flame retardant organopolysiloxane-polycarbonate graft copolymer in accordance with claim 1, which is made by phosgenating a bisphenol comprising a bisphenol polydiorganosiloxane adduct of the formula,

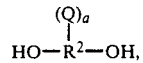

where Q is a monovalent radical having the formula,

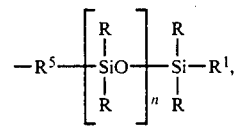

where R is a $C_{(1-13)}$ monovalent hydrocarbon radicals, or a $C_{(1-13)}$ monovalent hydrocarbon radical substituted with radicals inert during equilibration or condensation, $R^1$ is a $C_{(1-13)}$ monovalent hydrocarbon radical or a $C_{(1-13)}$ monovalent hydrocarbon radical substituted with radicals inert during equilibration and condensation, $R^2$ is a $C_{(6-30)}$ polyvalent aromatic organic radical, $R^5$ is a $C_{(2-10)}$ aliphatic organic radical, n is a whole number having a value of from 0 to 100 inclusive and a is an integer having a value of 1 to 4 inclusive.

3. A flame retardant organopolysiloxane-polycarbonate graft copolymer in accordance with claim 2, which is made by phosgenating a mixture of the bisphenol polydiorganosiloxane adduct of the formula

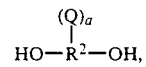

and a bisphenol of the formula,

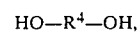

where $R^4$ is a $C_{(6-30)}$ divalent aromatic organic radical.

4. A flame retardant organopolysiloxane-polycarbonate graft copolymer in accordance with claim 1 which is made by effecting the hydrosilylation of an aromatic polycarbonate having condensed aliphatically unsaturated units of the formula,

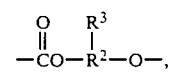

with a silicon hydride polydiorganosiloxane of the formula,

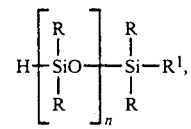

where R is a $C_{(1-13)}$ monovalent hydrocarbon radical, or a $C_{(1-13)}$ monovalent hydrocarbon radical substituted with radicals inert during equilibration or condensation, $R^1$ is a $C_{(1-13)}$ monovalent hydrocarbon radical or a $C_{(1-13)}$ monovalent hydrocarbon radical substituted with radicals inert during equilibration and condensation, $R^2$ is a $C_{(6-30)}$ polyvalent aromatic organic radical, $R^3$ is a $C_{(2-10)}$ aliphatically unsaturated organic radical, n is a whole number having a value of from 0 to 100 inclusive, and a is an integer having a value of 1 to 4 inclusive.

5. A flame retardant organopolysiloxane-polycarbonate graft copolymer in accordance with claim 1, where $R^2$ is

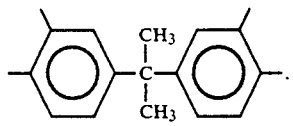

6. A flame retardant polydimethylpolysiloxanepolycarbonate graft copolymer in accordance with claim 1.

7. A flame retardant organopolysiloxane-polycarbonate graft copolymer in accordance with claim 1, where Q is

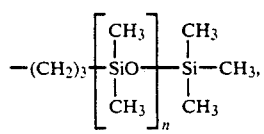

where n is a whole number equal to 0 to 100.

8. A bisphenol polydiorganosiloxane adduct of the formula,

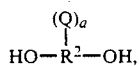

where Q is a monovalent radical having the formula,

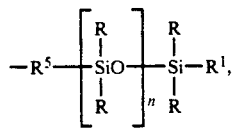

where R is a $C_{(1-13)}$ monovalent hydrocarbon radical, or a $C_{(1-13)}$ monovalent hydrocarbon radical substituted with radicals inert during equilibration or condensation, $R^1$ is a $C_{(1-13)}$ monovalent hydrocarbon radical or a $C_{(1-13)}$ monovalent hydrocarbon radical substituted with radicals inert during equilibration and condensation, $R^2$ is a $C_{(6-30)}$ polyvalent aromatic organic radical, $R^5$ is a $C_{(2-10)}$ aliphatic organic radical, n is a whole number having a value of from 0 to 100 inclusive and a is an integer having a value of 1 to 4 inclusive.

9. A bisphenol-polydimethylpolysiloxane adduct in accordance with claim 8.

10. A bisphenol-polydiorganosiloxane adduct in accordance with claim 8, where $R^2$ is

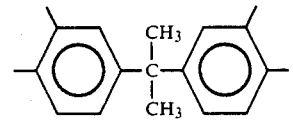

and Q is

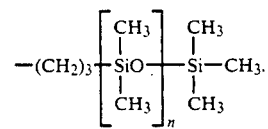

* * * * *